(12) United States Patent
Balakrishnan et al.

(10) Patent No.: US 9,483,592 B1
(45) Date of Patent: Nov. 1, 2016

(54) MAINTAINING STRESS IN A LAYOUT DESIGN OF AN INTEGRATED CIRCUIT HAVING FIN-TYPE FIELD-EFFECT TRANSISTOR DEVICES

(71) Applicant: International Business Machines Corporation, Armonk, NY (US)

(72) Inventors: Karthik Balakrishnan, White Plains, NY (US); Pouya Hashemi, White Plains, NY (US); Jeffrey W. Sleight, Ridgefield, CT (US); Tenko Yamashita, Schenectady, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/960,817

(22) Filed: Dec. 7, 2015

(51) Int. Cl.
G06F 17/50 (2006.01)

(52) U.S. Cl.
CPC ....... *G06F 17/5036* (2013.01); *G06F 2217/02* (2013.01)

(58) Field of Classification Search
CPC .................. G06F 17/5036; G06F 2217/02
USPC ....................................................... 716/106
See application file for complete search history.

(56) References Cited

U.S. PATENT DOCUMENTS

| | | | |
|---|---|---|---|
| 7,337,420 B2 | 2/2008 | Chidambarrao | |
| 7,761,278 B2 | 7/2010 | Chidambarrao | |
| 7,818,692 B2 | 10/2010 | Chidambarrao | |
| 8,037,433 B2 | 10/2011 | Chidambarrao | |
| 8,112,729 B2 | 2/2012 | Tonti | |
| 8,207,038 B2 | 6/2012 | Cheng | |
| 8,453,100 B2 | 5/2013 | Chidambarrao | |
| 8,745,571 B2 | 6/2014 | Li | |
| 8,889,540 B2 | 11/2014 | Basker | |
| 2015/0255543 A1 | 9/2015 | Cheng | |
| 2015/0325686 A1* | 11/2015 | Allibert | ............ H01L 29/66795 438/199 |

OTHER PUBLICATIONS

A. Khakifirooz et al., "Strain Engineering for Fully-Depleted SOI Devices." The Electrochemical Society Meeting Abstracts, No. 30, 2010, pp. 1905.

(Continued)

*Primary Examiner* — Jack Chiang
*Assistant Examiner* — Brandon Bowers
(74) *Attorney, Agent, or Firm* — Cantor Colburn LLP; Vazken Alexanian (57) ABSTRACT

A computer-implemented method for maintaining stress in an integrated circuit having fin-type field-effect transistor devices includes selecting, by a processor of a computer system, a representation of an initial layout design for the integrated circuit, the layout design having design shapes including existing fin shapes; adding, by the processor of the computer system, a fin shape to one or more of the existing fin shapes to merge the one or more existing fin shapes with another existing fin shape to form an extended fin shape; adding, by the processor of the computer system, gate contacts to gates which intersect the added fin shape to generate a modified layout design; and saving the modified layout design to a memory communicatively coupled to the processor of the computer system, where device operation of the initial layout design for the integrated circuit is maintained in the modified layout design for the integrated circuit.

20 Claims, 8 Drawing Sheets

(56) References Cited

OTHER PUBLICATIONS

F. Allibert et al., "Elastic relaxation in intrinsically-strained Fins: Simulations, physical and electrical characterization," SOI-3D-Subthreshold Microelectronics Technology Unified Conference (S3S), 2014, 3 pages.

\* cited by examiner

MAINTAINING STRESS IN A LAYOUT DESIGN OF AN INTEGRATED CIRCUIT HAVING FIN-TYPE FIELD-EFFECT TRANSISTOR DEVICES

BACKGROUND

The present invention relates to a method and system for maintaining stress in an integrated circuit having field-effect transistor devices, and more specifically, to transforming an existing layout design of an integrated circuit into a modified layout design.

Semiconductor devices are used in a variety of electronic applications such as personal computers, cell phones, digital cameras and other electronic equipment. Semiconductor devices are typically fabricated by sequentially depositing insulating or dielectric layers, conductive layers, and semiconductive layers of material over a semiconductor substrate, and patterning the various material layers using lithography to form circuit components and elements thereon.

Multiple gate field-effect transistors ("MuGFET") are a recent development in semiconductor technology which typically are metal oxide semiconductor field-effect transistors ("MOSFET") that incorporate more than one gate into a single device. The multiple gates may be controlled by a single gate electrode, where the multiple gate surfaces act electrically as a single gate, or by independent gate electrodes. One type of MuGFET is referred to as fin-type field-effect transistor "FinFET," which is a transistor structure with a fin-like semiconductor channel that is raised vertically out of the semiconductor surface of an integrated circuit.

In FinFETs, stress, e.g., uniaxial strain, in the fins contributes to the overall device performance. Strain relaxation occurs at locations near the ends of the fins when the fins are cut in manufactured integrated circuits having field-effect devices. In existing layout designs for manufactured integrated circuits having FinFETs, this strain relaxation of the fins degrades transistor performance due to mobility degradation.

Therefore, there is a need for improved design methods and systems for FinFETs which address the above disadvantages.

SUMMARY

According to an embodiment of the present invention, a computer-implemented method for maintaining stress in an integrated circuit having fin-type field-effect transistor devices is provided. The method comprises selecting, by a processor of a computer system, a representation of an initial layout design for the integrated circuit, the layout design having design shapes comprising existing fin shapes; adding, by the processor of the computer system, a fin shape to one or more of the existing fin shapes to merge the one or more existing fin shapes with another existing fin shape to form an extended fin shape; adding, by the processor of the computer system, gate contacts to gates which intersect the added fin shape to generate a modified layout design; and saving the modified layout design to a memory communicatively coupled to the processor of the computer system, wherein device operation of the initial layout design for the integrated circuit is maintained in the modified layout design for the integrated circuit.

According to another embodiment of the present invention, a system for maintaining stress in an integrated circuit having fin-type field-effect transistor devices is provided. The system comprises a memory; a processor communicatively coupled to the memory, where the processor is configured for selecting a representation of an initial layout design for the integrated circuit, the layout design having design shapes comprising existing fin shapes; adding a fin shape to one or more of the existing fin shapes to merge the one or more existing fin shapes with another existing fin shape to form an extended fin shape; and adding gate contacts to gates which intersect the added fin shape to generate a modified layout design, wherein device operation of the initial layout design for the integrated circuit is maintained in the modified layout design for the integrated circuit.

According to another embodiment of the present invention, a computer program product for maintaining stress in an integrated circuit having fin-type field-effect transistor devices is provided. The computer program product comprises a computer readable storage medium having a computer readable program code embodied therewith, the computer readable program code configured for selecting a representation of an initial layout design for the integrated circuit, the layout design having design shapes comprising existing fin shapes; adding a fin shape to one or more of the existing fin shapes to merge the one or more existing fin shapes with another existing fin shape to form an extended fin shape; and adding gate contacts to gates which intersect the added fin shape to generate a modified layout design, wherein device operation of the initial layout design for the integrated circuit is maintained in the modified layout design for the integrated circuit.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
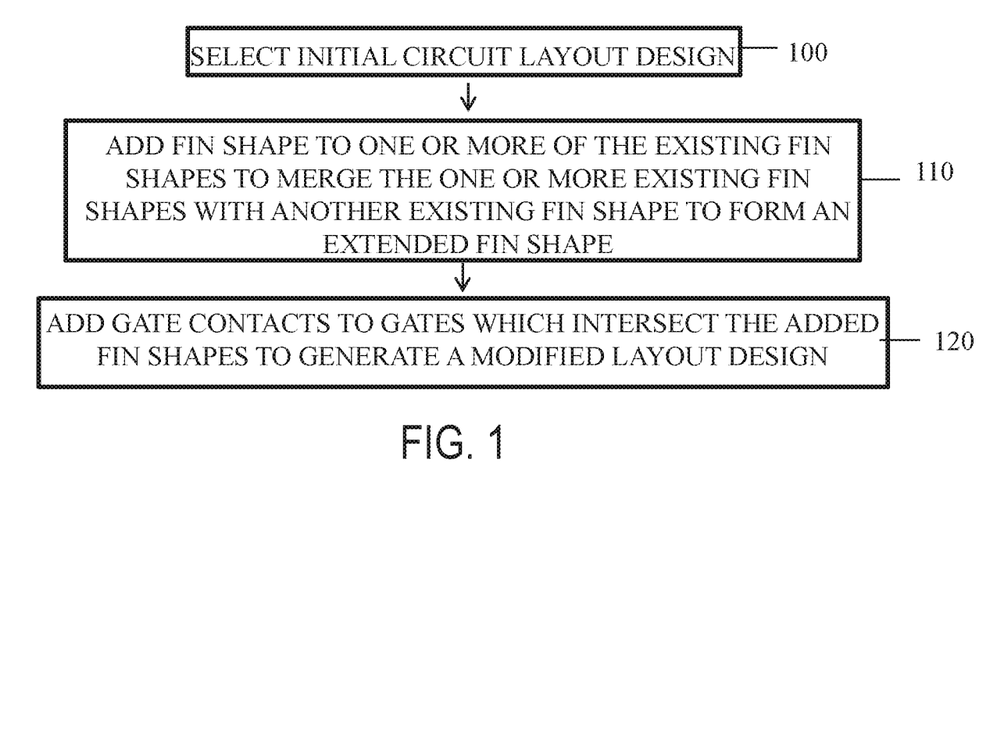
FIG. 1 is a flowchart of an embodiment of the computer-implemented method for increasing stress in a layout design of an integrated circuit having fin-type field-effect transistor devices ("FinFETs")

With reference now to FIG. 1, a flow chart of an embodiment of a computer-implemented method for maintaining stress in an integrated circuit having fin-type field-effect transistor devices ("FinFETs") is shown. The process begins in step 100 in which a representation of an initial layout design for the integrated circuit having design shapes is selected by a processor of a computer system. Next, in step 110, a fin shape is added by the processor of the computer system to one or more existing fin shapes to merge the one or more existing fin shapes with another existing fin shape to form an extended fin shape. In step 120, gate contacts are added by the processor of the computer system to gates which intersect the added fin shape to generate a modified layout design. The modified layout design is then saved to a memory communicatively coupled to the processor of the computer system.

The computer-implemented method transforms an existing layout design for an integrated circuit having design shapes into a modified layout design by adding fin shapes to one or more existing fin shapes to merge the one or more existing fin shapes with another existing fin shape. The modified layout design results in fewer cuts in fin shapes, thereby improving stress, e.g., uniaxial strain, in the transistor devices, while maintaining the topology of the initial layout design and device operation of the integrated circuit. The extended fin shapes maintain stress along the merged existing fin shapes, improving the overall stress of the fin shapes. The improved stress, e.g. increase in uniaxial strain, due to the extended fin shapes results in an improvement in device operation.

Figure 2:
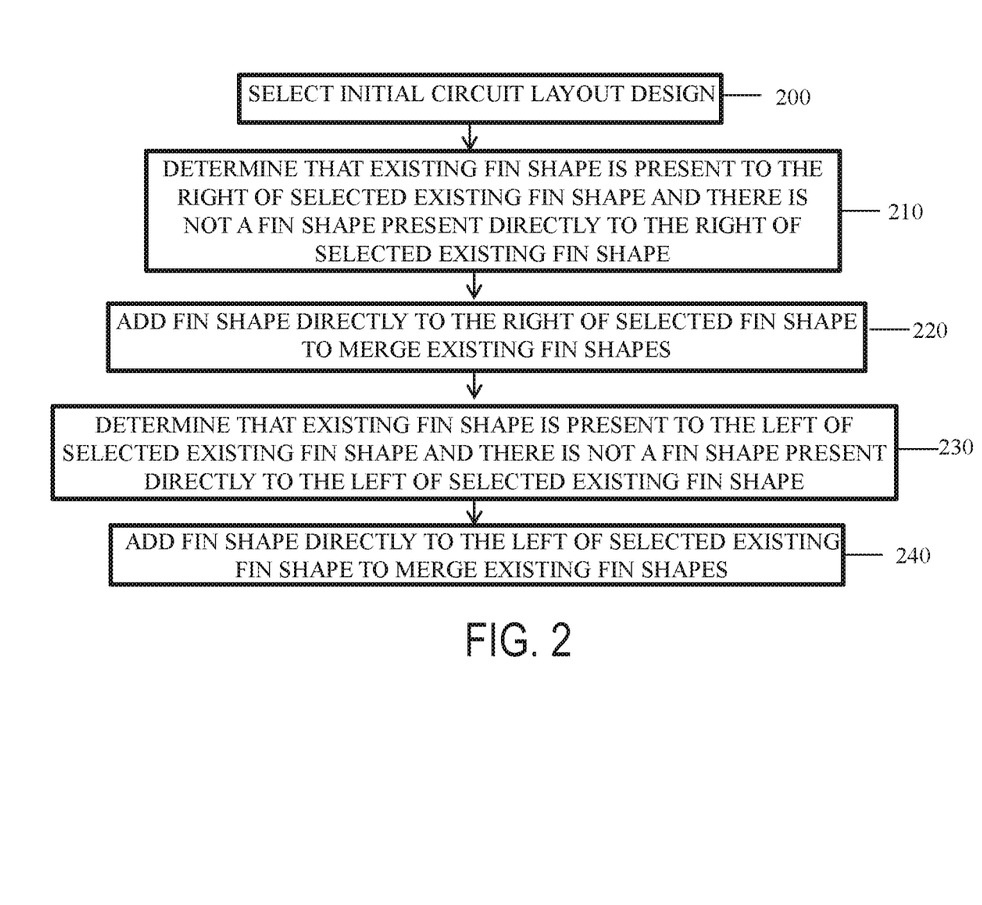
FIG. 2 is a flowchart of an embodiment of adding fin shapes using the computer-implemented method of FIG. 1.

Referring to FIG. 2, a flowchart of an embodiment of adding fin shapes to the initial layout design using the computer-implemented method of FIG. 1 is shown. The process begins in step 200 in which, an initial layout design having design shapes is selected. Next, in step 210, for each selected existing fin shape in the initial layout design, it is determined whether another fin shape is present to the right of the selected existing fin shape and that there is not another existing fin shape present directly to the right of the selected existing fin shape. In step 220, when it is determined that a selected existing fin shape meets the above criteria, a fin shape is added directly to the right of the selected existing fin shape to form an extended fin shape. In step 230, it is determined whether another fin shape is present to the left of the selected existing fin shape and that there is not another existing fin shape present directly to the left of the selected existing fin shape. In step 240, when it is determined that a selected existing fin shape meets the above criteria, a fin shape is added directly to the left of the selected existing fin shape to form an extended fin shape.

In an embodiment of the computer-implemented method, for each selected existing fin shape in the initial layout design, it is determined, by the processor of the computer system, whether another fin shape is present at about one contacted poly pitch ("CPP") to the right of the selected existing fin shape and that there is not another existing fin shape present directly to the right of the selected existing fin shape. When it is determined that a selected existing fin shape meets the above criteria, a fin shape having a length of about one CPP is added, by the processor of the computer system, to the right of the selected existing fin shape to form an extended fin shape. It is then determined, by the processor of the computer system, whether another fin shape is present at about one CPP to the left of the selected existing fin shape and that there is not another existing fin shape present directly to the left of the selected existing fin shape. When it is determined that a selected existing fin shape meets the above criteria, a fin shape having a length of about one CPP is added, by the processor of the computer system, to the left of the selected existing fin shape to form an extended fin shape.

Figure 3A:
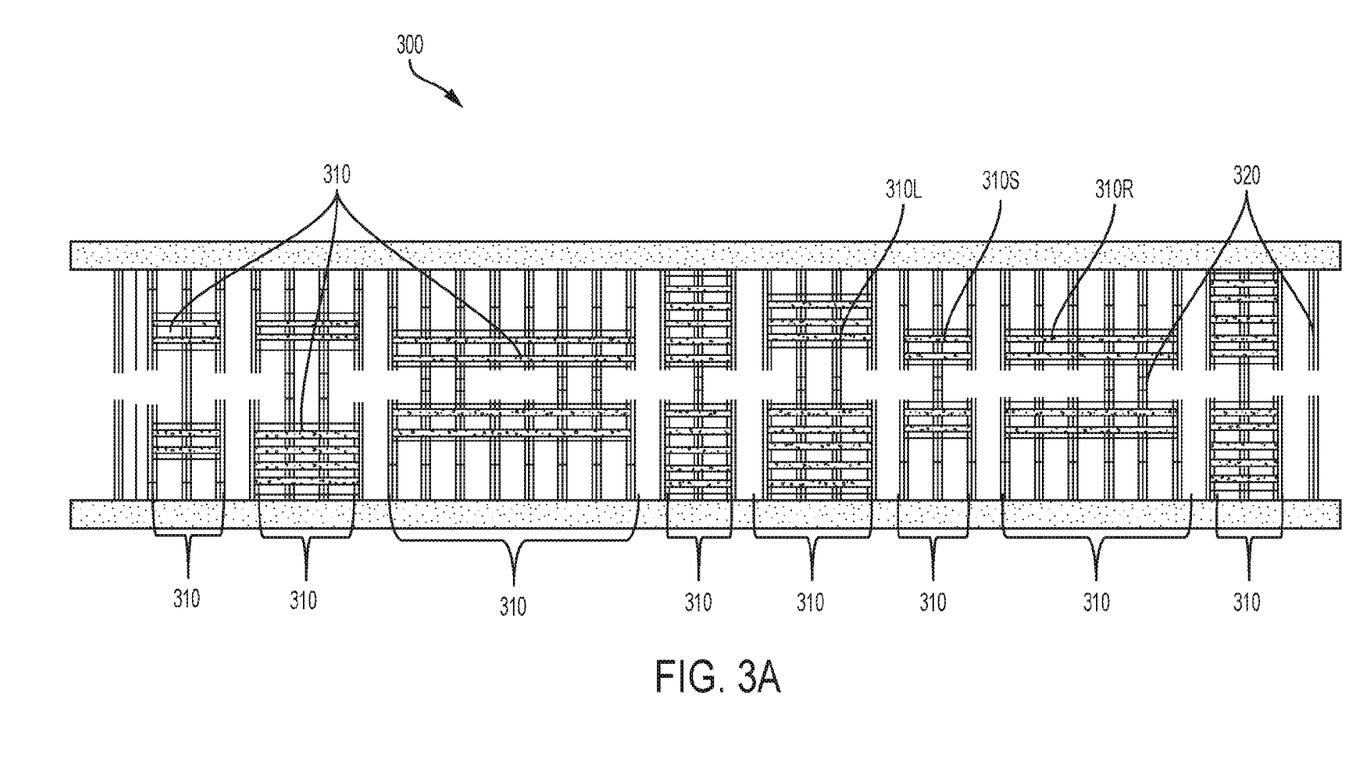
FIG. 3A is a top view of a selected initial layout design of an integrated circuit having FinFETs in an embodiment of the computer-implemented method.

Referring to FIG. 3A, a top view of a selected initial layout design 300 of an integrated circuit having FinFETs selected in an embodiment of the computer-implemented method is shown. The initial layout design of the integrated circuit 300 includes existing fin shapes 310 and gates 320. More specifically, as shown in FIG. 3, the initial layout design of the integrated circuit 300 includes a selected existing fin shape 310S, an existing fin shape 310R to the right of the selected existing fin shape 310S and an existing fin shape 310L to the left of the selected existing fin shape 310S.

The fin lengths and number of fins in the initial layout design shown in FIG. 3A are provided below in Table 1.

TABLE 1

| Fin Length (CPP) | Number of Fins |
|---|---|
| 2 | 28 |
| 3 | 14 |
| 4 | 0 |
| 5 | 4 |
| 6 | 0 |
| 7 | 4 |

Based on the fin lengths and number of fins provided in Table 1, the average fin length in the initial layout design is 2.9 CPP.

In an embodiment, the field-effect transistor devices are N-channel field-effect transistors. In another embodiment, the field-effect transistor devices comprise P-channel field-effect transistors.

Figure 3B:
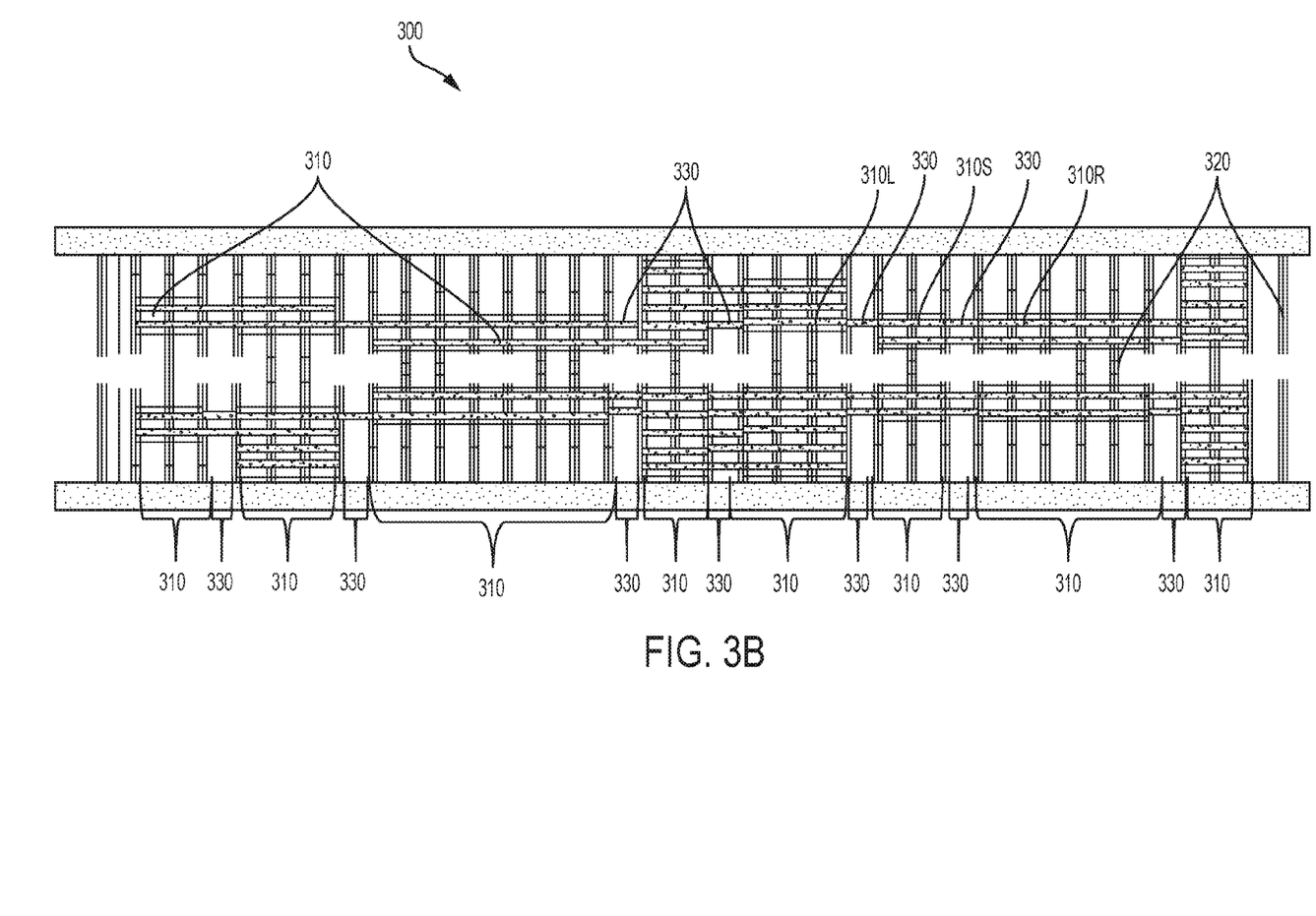
FIG. 3B is a top view of the selected initial layout design of FIG. 3A to which fin shapes have been added to form extended fin shapes.

Referring to FIG. 3B, a top view of the selected initial layout design of FIG. 3A to which fin shapes have been added to form extended fin shapes is shown. The layout design of the integrated circuit 300 includes existing fin shapes 310 and gates 320. Fin shapes 330 have been added to the initial layout design as described above.

In an embodiment, the average fin length is extended to increase the average distance from a center of a gate-fin intersection of the transistor to the edge of the selected fin shape and corresponding transistor.

The fin lengths and number of fins in the layout design shown in FIG. 3B in which fin shapes have been added to merge existing fin shapes to form an extended fin shape are provided below in Table 2.

TABLE 2

| Fin Length (CPP) | Number of Fins |
|---|---|
| 2 | 7 |
| 3 | 2 |
| 6 | 7 |
| 10 | 1 |
| 11 | 1 |
| 26 | 1 |
| 33 | 2 |

As may be seen from the fin lengths and number of fins in Table 2, the average fin length in the layout design is 8.3 CPP. Table 2 thus shows an increase in the average fin length after fin shapes are added to form extended fin shapes in the layout design.

In an embodiment, the average length the extended fin shapes in the layout design is from about 2 to about 20 CPP, specifically from about 2 to about 15 CPP, more specifically from about 7 to about 12 and even more specifically from about 5 to about 10 CPP.

In another embodiment, the average length of the extended fin shapes is equal to or greater than about 2 CPP, specifically equal to or greater than about 5 CPP, more specifically equal to or greater than about 8 CPP and even more specifically equal to or greater than about 10 CPP.

Figure 3C:
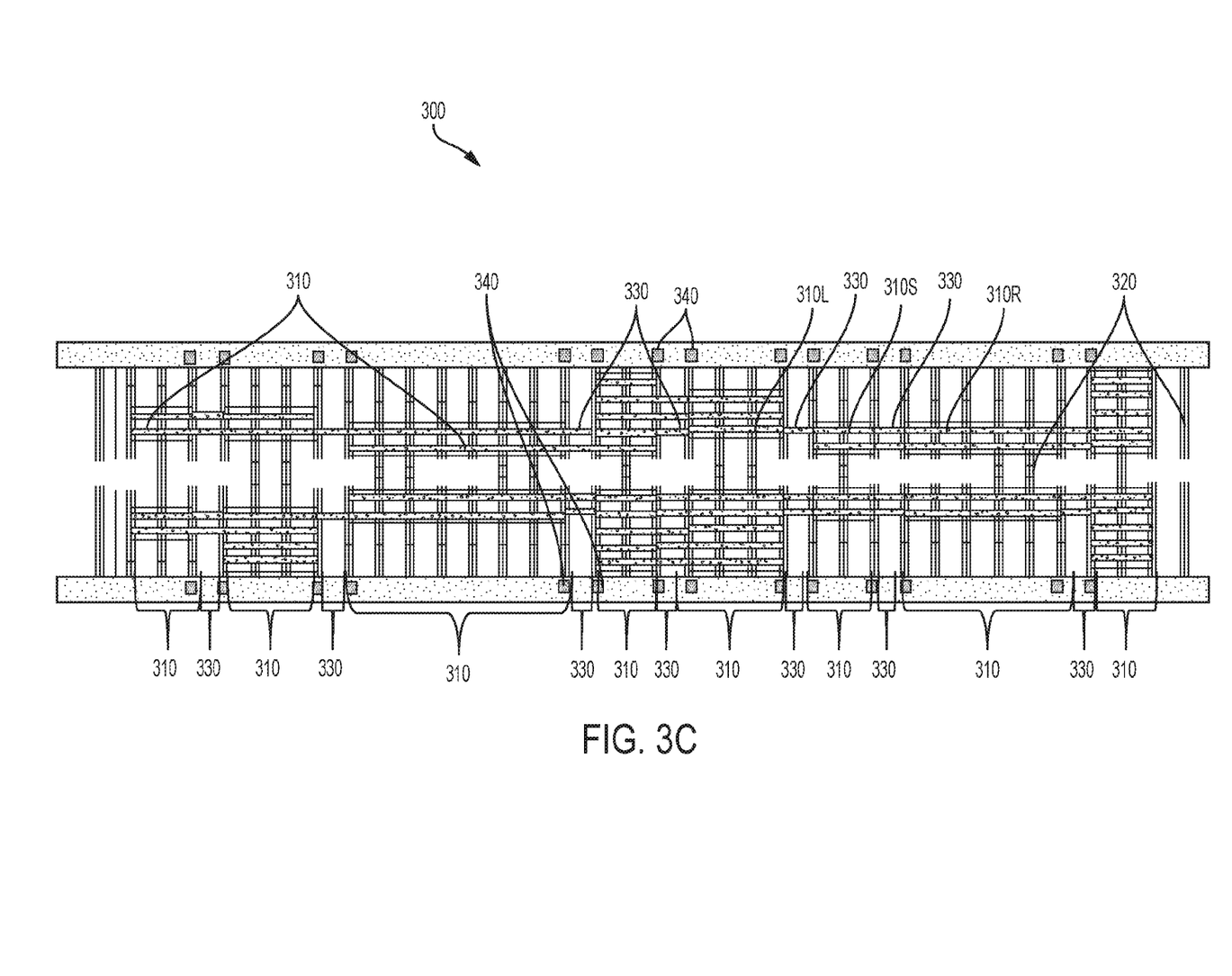
FIG. 3C is a top view of a modified layout design generated in an embodiment of the computer-implemented method after fin shapes and gate contacts have been added to the selected initial layout design of FIG. 3B.

Referring to FIG. 3C, a top view of a modified layout design generated in an embodiment of the computer-implemented method after fin shapes and gate contacts have been added to the selected initial layout design of FIG. 3B is shown. The modified layout design of the integrated circuit 300 includes existing fin shapes 310 and gates 320. Fin shapes 330 have been added to the initial layout design as described above with regard to FIG. 3B. The modified layout design of the integrated circuit 300 further includes gate contacts 340 which have been added to gates which intersect the added fin shape.

In an embodiment, the gate contacts are added to dummy gates. In an aspect of the embodiment, the dummy gates are part of new transistors formed by the addition of fin shapes and gate contacts to the initial layout design. These new transistors, also termed "parasitic" transistors or "dummy FETs," are turned off during the operation of the integrated circuit. The modified layout design of the integrated circuit thus includes active FETs which were present in the initial layout design as well as dummy FETs generated by adding fin shapes and gate contacts as described above. The dummy FETs formed by generating the modified layout design thus impart stress onto the existing fin shapes of the initial layout design, while the overall device operation of the integrated circuit is maintained. The increased stress in turn results in improved performance of the integrated circuit.

The addition of the dummy FETs may result in an increased leakage current in the integrated circuit. The design shapes and gate contacts added by the method described herein may be adjusted to take into account desired thresholds for the increased leakage current as well as for the improved stress benefits obtained using the modified layout design.

Figure 4:
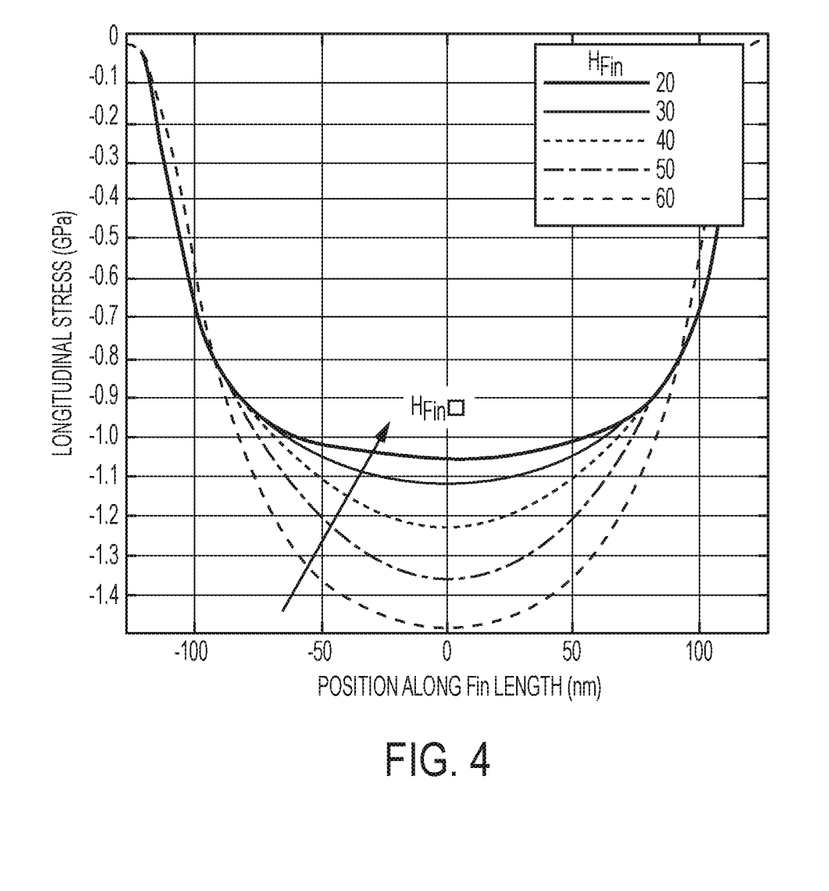
FIG. 4 is a graph of longitudinal stress in at varying positions along the length of a fin shape having a total length of 250 nanometers.

Referring to FIG. 4, a graph of longitudinal stress at varying positions along the length of a fin shape having a total length of 200 nanometers. As may be seen in the graph of FIG. 4, complete relaxation occurs at the edges of a fin having a length of 200 nanometers. The fin shapes added to the initial layout design improve the stress at the ends of the existing fin shapes by merging the existing fin shapes to maintain stress between the existing fin shapes. The overall stress, e.g., uniaxial strain, of fin shapes in the modified layout design is thus improved relative to the overall stress of the existing fin shapes in the initial layout design.

Figure 5:
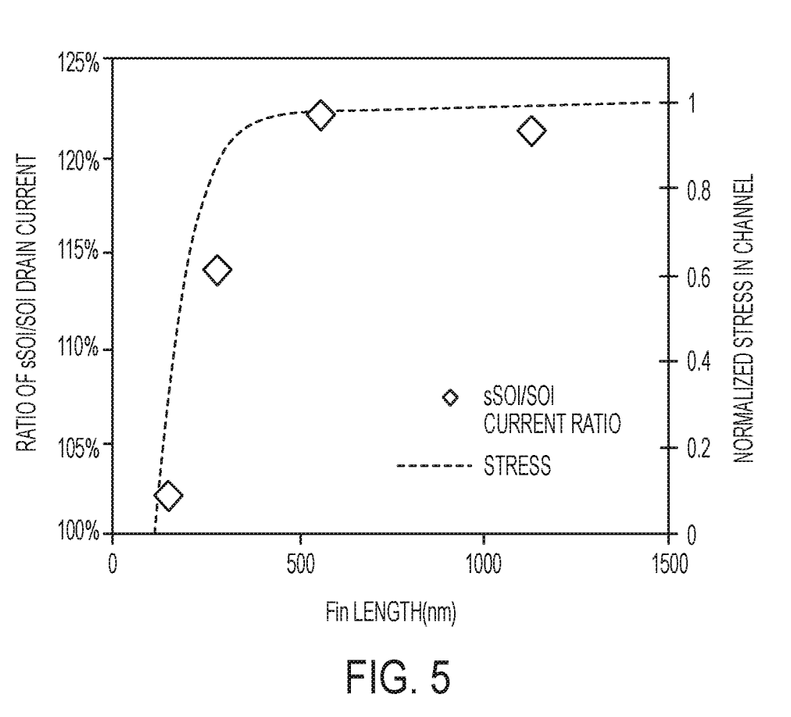
FIG. 5 is a graph of transistor saturation current and normalized stress in channel at varying positions along the length of a fin shape having a length of from 100 nanometers to 1,500 nanometers.

Referring to FIG. 5, a graph of transistor saturation current and normalized at varying positions along the length of a fin shape having a length of from 100 nanometers (nm) to 1,500 nm is shown. As may be seen from the graph of FIG. 5, the transistor saturation current and stress increase as the length of the fin shape increases, until reaching a plateau. As may also be seen from the graph of FIG. 5, when the length of a fin shape is increased to 500 nm (10 CPP), there is a 20% improvement in transistor saturation current when compared to a fin shape having a length of 100 nm (2 CPP).

In an embodiment, the transistor saturation current is increased from about 5% to about 30%, specifically from about 10% to about 25%, more specifically from about 15% to about 20% and even more specifically about 20% in the modified layout design relative to the initial layout design.

In another embodiment, an integrated circuit is manufactured using the modified layout design generated by the method described above.

In another embodiment, a system for increasing stress in an integrated circuit having field-effect transistor devices comprises a memory; a processor communicatively coupled to the memory, where the processor is configured for selecting a representation of an initial layout design for the integrated circuit, the layout design having design shapes comprising existing fin shapes; adding a fin shape to one or more of the existing fin shapes to merge the one or more existing fin shapes with another existing fin shape to form an extended fin shape; and adding gate contacts to gates which intersect the added fin shape to generate a modified layout design, wherein device operation of the integrated circuit is maintained.

In another embodiment, a computer program product for maintaining stress in an integrated circuit having field-effect transistor devices comprises a computer readable storage medium having a computer readable program code embodied therewith, the computer readable program code configured for selecting a representation of an initial layout design for the integrated circuit, the layout design having design shapes comprising existing fin shapes; adding a fin shape to one or more of the existing fin shapes to merge the one or more existing fin shapes with another existing fin shape to form an extended fin shape; and adding gate contacts to gates which intersect the added fin shape to generate a modified layout design, wherein device operation of the integrated circuit is maintained.

Figure 6:
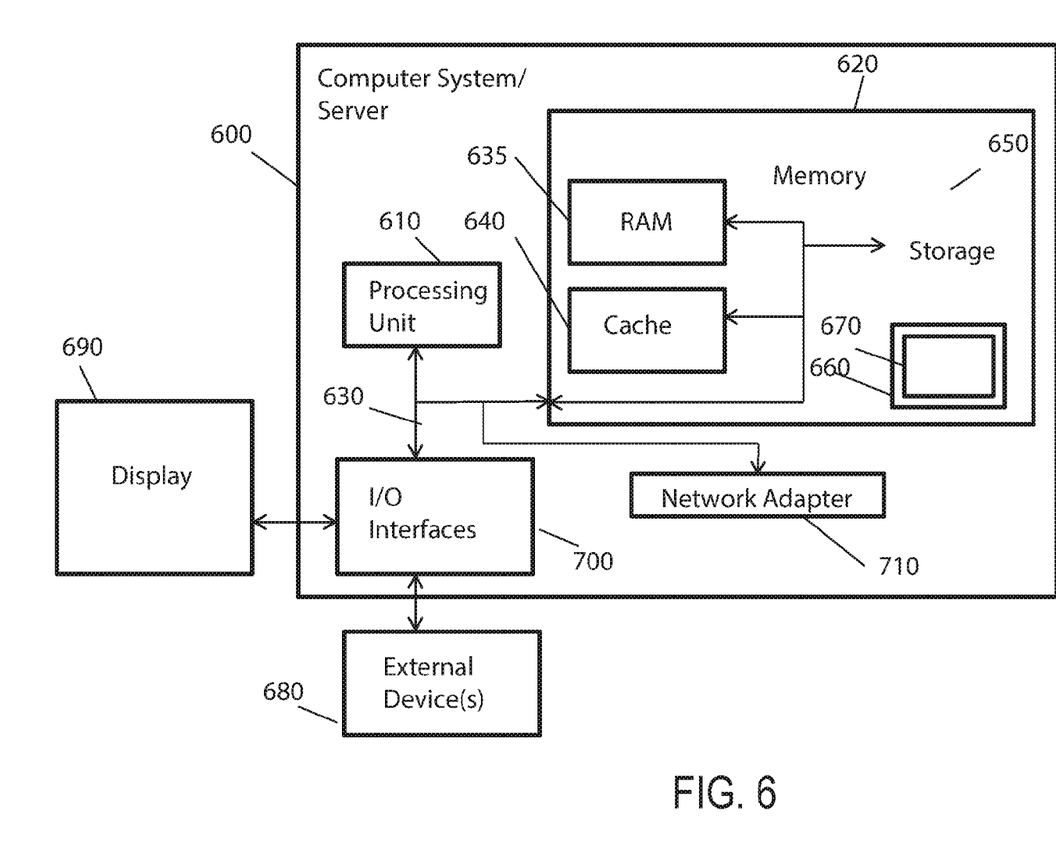
FIG. 6 is a block diagram illustrating an embodiment of an information processing system used in the computer-implemented method.

Referring to FIG. 6, a block diagram illustrating an information processing system is shown. The information processing system 600 is based upon a suitably configured processing system configured to implement one or more embodiments described herein. Any suitably configured processing system can be used as the information processing system 600 in the embodiments described herein. The components of the information processing system 600 can include, but are not limited to, one or more processors or processing units 610, a system memory 620 and a bus 630 that couples various system components including the system memory 620 to the processor 610.

The bus 630 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture bus, Enhanced ISA bus, Video Electronics Standards Association local bus and Peripheral Component Interconnects bus.

The system memory 620 can also include computer system readable media in the form of volatile memory, such as random access memory ("RAM") 635 and/or cache memory 640. The information processing system 600 can further include other removable/non-removable, volatile/non-volatile computer system storage media. By way of example only, a storage system 650 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 630 by one or more data media interfaces. The memory 620 can include at least one program product having a set of program modules that are configured to carry out the functions of the embodiment described herein.

Program/utility 660, having a set of program modules 670, may be stored in memory 620 by way of example, and not limitation, as well as an operating system, one or more application programs, other program modules, and program data. Each of the operating system, one or more application programs, other program modules and program data or some combination thereof, may include an implementation of a networking environment. Program modules 670 generally carry out the functions and/or methodologies of the embodiments described herein.

The information processing system 600 can also communicate with one or more external devices 680 such as a keyboard, a pointing device, a display 690, etc.; one or more devices that enable a user to interact with the information processing system 600; and/or any devices, e.g., network card, modem, etc., that enable computer system/server 600 to communicate with one or more other computing devices. Such communication can occur via I/O interfaces 700. Still yet, the information processing system 600 can communicate with one or more networks such as a local area network, a general wide area network, and/or a public network, e.g., the Internet, via network adapter 710. As depicted, the network adapter 710 communicates with the other components of information processing system 600 via the bus 630. Other hardware and/or software components can also be used in conjunction with the information processing system 600. Examples include, but are not limited to: microcode, device drivers, redundant processing units, external disk drive arrays, RAID systems, tape drives and data archival storage systems.

Certain aspects of the embodiments described herein may be a system, method or computer program product. Accordingly, the embodiments described herein may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for maintaining stress in an integrated circuit having fin-type field-effect transistor devices, the method comprising:
    selecting, by a processor of a computer system, a representation of an initial layout design for the integrated circuit, the layout design having design shapes comprising existing fin shapes;
    adding, by the processor of the computer system, a fin shape to one or more of the existing fin shapes to merge the one or more existing fin shapes with another existing fin shape to form an extended fin shape;
    adding, by the processor of the computer system, gate contacts to gates which intersect the added fin shape to generate a modified layout design,
    saving the modified layout design to a memory communicatively coupled to the processor of the computer system,
    wherein device operation of the initial layout design for the integrated circuit is maintained in the modified layout design for the integrated circuit, and
    forming the modified layout design in an integrated circuit.

2. The computer-implemented method of claim 1, wherein adding a fin shape to one or more existing fin shapes to merge the one or more existing fin shapes with another existing fin shape to form an extended fin shape comprises:
    determining, by the processor of the computer system, for each selected existing fin shape in the layout design, that another existing fin shape is present at about one contacted poly pitch to the right of the selected existing fin shape and that there is not another existing fin shape present directly to the right of the selected existing fin shape;
    adding, by the processor of the computer system, a fin shape having a length of about one contacted poly pitch to the right of the selected existing fin shape to form an extended fin shape;
    determining, by the processor of the computer system, for each selected existing fin shape in the layout design, that another existing fin shape is present at about one contacted poly pitch to the left of the selected existing fin shape and that there is not another existing fin shape present directly to the left of the selected existing fin shape; and
    adding, by the processor of the computer system, a fin shape having a length of about one contacted poly pitch to the left of the selected existing fin shape to form an extended fin shape.

3. The computer-implemented method of claim 1, wherein the field-effect transistor devices comprise N-channel field-effect transistors.

4. The computer-implemented method of claim 1, wherein the field-effect transistor devices comprise P-channel field-effect transistors.

5. The computer-implemented method of claim 1, wherein uniaxial strain is increased in the modified layout design relative to the initial layout design.

6. The computer-implemented method of claim 1, wherein the length of the extended fin shape in the modified layout design is equal to or greater than about 10 contacted poly pitches.

7. The computer-implemented method of claim 1, wherein transistor saturation current is increased from about 10% to about 30% in the modified layout design relative to the initial layout design.

8. The computer-implemented method of claim 1, wherein transistor saturation current is increased about 20% or more in the modified layout design relative to the initial layout design.

9. A system for maintaining stress in an integrated circuit having fin-type field-effect transistor devices, the system comprising:
    a memory;
    a processor communicatively coupled to the memory, where the processor is configured for:
        selecting a representation of an initial layout design for the integrated circuit, the layout design having design shapes comprising existing fin shapes;
        adding a fin shape to one or more of the existing fin shapes to merge the one or more existing fin shapes with another existing fin shape to form an extended fin shape;
        adding gate contacts to gates which intersect the added fin shape to generate a modified layout design,
        wherein device operation of the initial layout design for the integrated circuit is maintained in the modified layout design for the integrated circuit, and
        forming the modified layout design in an integrated circuit.

10. The system of claim 9, wherein adding a fin shape to one or more existing fin shapes to merge the one or more existing fin shapes with another existing fin shape to form an extended fin shape comprises:
    determining, for each selected existing fin shape in the layout design, that another fin shape is present at about one contacted poly pitch to the right of the selected existing fin shape and that there is not another existing fin shape present directly to the right of the selected existing fin shape;

adding a fin shape having a length of about one contacted poly pitch to the right of the selected existing fin shape to form an extended fin shape;

determining, for each selected existing fin shape in the layout design, that another fin shape is present at about one contacted poly pitch to the left of the selected existing fin shape and that there is not another fin shape present directly to the left of the selected existing fin shape; and adding a fin shape having a length of about one contacted poly pitch to the left of the selected existing fin shape to form an extended fin shape.

11. The system of claim 9, wherein the field-effect transistor devices comprise N-channel field-effect transistors.

12. The system of claim 9, wherein the field-effect transistor devices comprise P-channel field-effect transistors.

13. The system of claim 9, wherein uniaxial strain is increased in the modified layout design relative to the initial layout design.

14. The system of claim 9, wherein the length of the extended fin shape in the modified layout design is equal to or greater than about 10 contacted poly pitches.

15. The system of claim 9, wherein transistor saturation current is increased from about 10% to about 30% in the modified layout design relative to the initial layout design.

16. A computer program product for maintaining stress in an integrated circuit having fin-type field-effect transistor devices, the computer program product comprising:

a computer readable storage medium having a computer readable program code embodied therewith, the computer readable program code configured for:

selecting a representation of an initial layout design for the integrated circuit, the layout design having design shapes comprising existing fin shapes;

adding a fin shape to one or more of the existing fin shapes to merge the one or more existing fin shapes with another existing fin shape to form an extended fin shape;

adding gate contacts to gates which intersect the added fin shape to generate a modified layout design, wherein device operation of the initial layout design for the integrated circuit is maintained in the modified layout design for the integrated circuit, and forming the modified layout design in an integrated circuit.

17. The computer program product of claim 16, wherein the field-effect transistor devices comprise N-channel field-effect transistors.

18. The computer program product of claim 16, wherein the field-effect transistor devices comprise P-channel field-effect transistors.

19. The computer program product of claim 16, wherein uniaxial strain is increased in the modified layout design relative to the initial layout design.

20. The computer program product of claim 16, wherein transistor saturation current is increased from about 10% to about 30% in the modified layout design relative to the initial layout design.

* * * * *